No. 731,809.

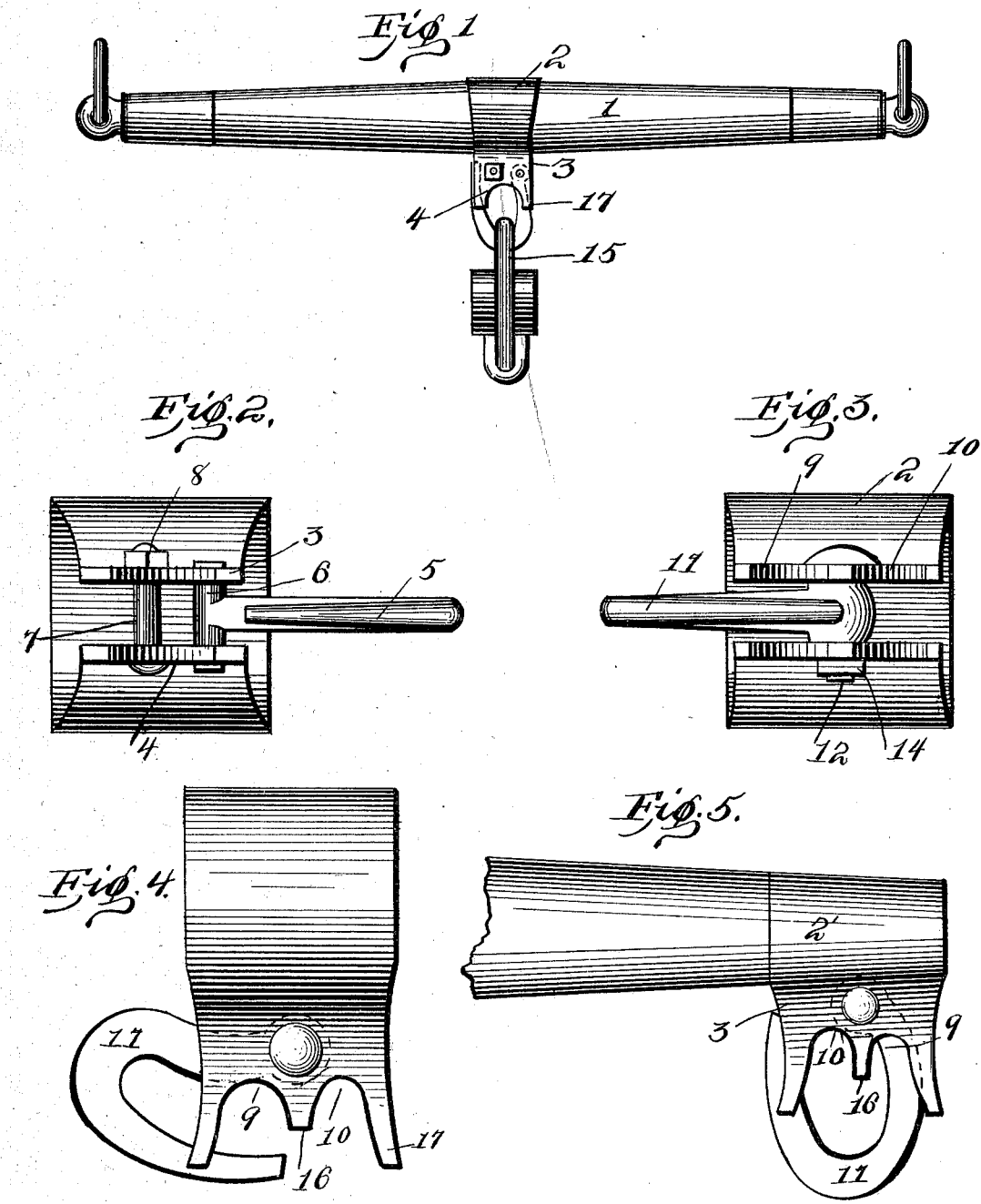

Patented June 23, 1903.

UNITED STATES PATENT OFFICE.

ARTHUR R. OTTERMAN, OF BRIDGEVILLE, PENNSYLVANIA, ASSIGNOR OF ONE-HALF TO THE OTTERMAN MANUFACTURING COMPANY, OF BRIDGEVILLE, PENNSYLVANIA.

HOOK.

SPECIFICATION forming part of Letters Patent No. 731,809, dated June 23, 1903.

Application filed November 11, 1902. Serial No. 130,839. (No model.)

*To all whom it may concern:*

Be it known that I, ARTHUR R. OTTERMAN, a citizen of the United States of America, residing at Bridgeville, in the county of Allegheny and State of Pennsylvania, have invented certain new and useful Improvements in Hooks, of which the following is a specification, reference being had therein to the accompanying drawings.

This invention relates to certain new and useful improvements in hooks, such as are particularly adapted for and are used in connection with breast-yokes, neck-yokes, whiffletrees, doubletrees, and the like; and the primary object of the invention is to construct a hook with which the connecting link, ring, or other device may be easily and quickly engaged and which will be securely held in engagement with the hook against accidental displacement.

Briefly described, my invention comprises a band or ferrule adapted to embrace the breast-yoke, neck-yoke, or whiffletree, doubletree, or the like, and which is provided with outwardly-extending lugs or cheek-pieces, in which the hook is pivotally mounted. The outwardly-extending lugs or cheek-pieces are provided with recesses into which it is necessary to force the link, ring, or other object connected to the hook before said link, ring, or the like may be disengaged from the hook.

Heretofore and before my invention with devices for similar purposes the same have been liable to become disengaged as the breast-yoke, whiffletree, or the like was swung or vibrated during its travel. It is the object of my invention to obviate this danger or to at least reduce the same to the minimum; and the invention resides in the novel construction, combination, and arrangement of parts, to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a plan elevation showing my improved hook attached to a breast-yoke. Fig. 2 is a detached detail view showing the hook in the opened position. Fig. 3 is a like view showing a modified form of construction of hook. Fig. 4 is a detail side elevation of the same, showing the hook in the opened position. Fig. 5 is a view showing the application of the hook to the end of a swingletree, breast-yoke, or other device.

My invention embodies a sleeve or ferrule provided with cheek-pieces in which is pivoted a hook member to be engaged by the ring, link, or the like. As seen in Figs. 1 and 2, the member which embraces the breast-yoke 1 consists of a sleeve or band 2, the ends of which project beyond the breast-yoke to form cheek-pieces 3, each of which is provided with a conical seat 4. The hook 5 is provided with a T-shaped end or head 6, which is journaled to the cheek-pieces 3, the latter being connected together by the bolt 7, passed therethrough and secured by the nut 8. In Fig. 3 I show the band or sleeve 2 provided with cheek-pieces, though in this construction I provide two seats 9 and 10 in the ends of the cheek-pieces, and a hook 11 is secured in the cheek-pieces by means of a bolt 12 and nut 14, this bolt and nut also acting as a means for drawing the cheek-pieces together and binding the band or sleeve 2 securely upon the neck-yoke. The seat 9, as seen in Fig. 4 of the drawings, is made of greater depth than the seat 10, the function of this being that in case the ring 15, as seen in Fig. 1 of the drawings, is engaged in the seat 9 the hook 11 when swung back to its fullest extent, as seen in Fig. 4, will still not permit the disengagement of the ring 15, as the latter would not have sufficient clearance-space between the end of the hook and the projection 16 between the seats 9 and 10. The forming of either the single seat 4, as seen in Figs. 1 and 2, or of the seats 9 and 10, as seen in Figs. 3 and 4, forms the side tongues or extensions 17, which serve to retain the ring in engagement with the hook.

In Fig. 5 I show a slightly-modified form, the cheek-pieces 3 being formed integral with the ordinary ferrule 2′, which is adapted to fit on the end of the swingletree, doubletree, neck-yoke, breast-yoke, or the like. The hook 11 may be pivotally mounted between these cheek-pieces by means of the bolt 12, which also acts as the means for binding the ferrule upon the neck-yoke, or the hook provided with a T-shaped end may be employed and a separate bolt employed for binding the ferrule upon the yoke or other device.

By arranging the hook as described its free end will contact with the breast-yoke, and thereby limit its movement.

Having fully described my invention, what I claim as new, and desire to secure by Letters Patent, is—

The combination with the sleeve formed with cheek-pieces, of outwardly-projecting tongues formed integral with the said cheek-pieces, said tongues being spaced apart, and a hook pivotally mounted between the said cheek-pieces at a point beyond the inner ends of the said tongues, and having its free end extending between the said cheek-pieces and normally lying in a plane approximately parallel to the pivoted end thereof.

In testimony whereof I affix my signature in the presence of two witnesses.

ARTHUR R. OTTERMAN.

Witnesses:
A. M. WILSON,
E. E. POTTER.